Aug. 19, 1958 W. A. WAGNER 2,847,885
DEEP HOLE DRILL

Filed Aug. 2, 1956 3 Sheets-Sheet 1

INVENTOR.
WILLIAM A. WAGNER
BY
Oberlin & Limbach
ATTORNEYS.

Aug. 19, 1958 — W. A. WAGNER — 2,847,885
DEEP HOLE DRILL

Filed Aug. 2, 1956 — 3 Sheets-Sheet 2

INVENTOR.
WILLIAM A. WAGNER
BY
Oberlin & Limbach
ATTORNEYS.

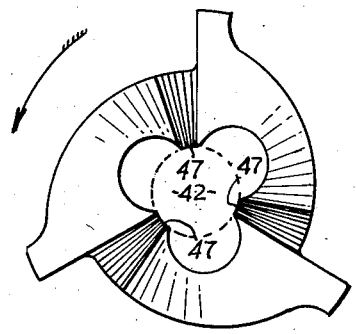
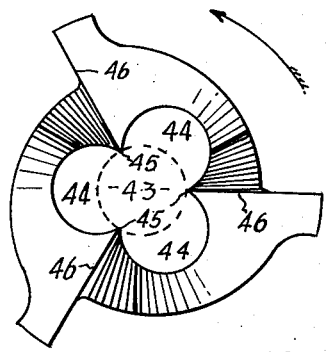
Fig. 13
Fig. 14
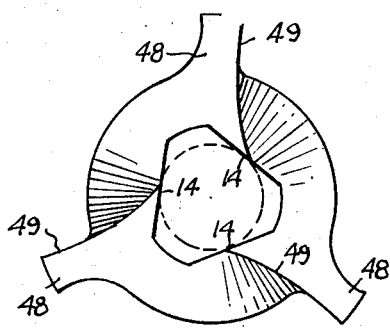
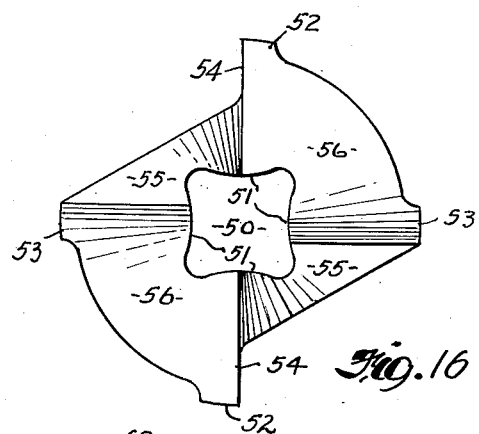
Fig. 15
Fig. 16
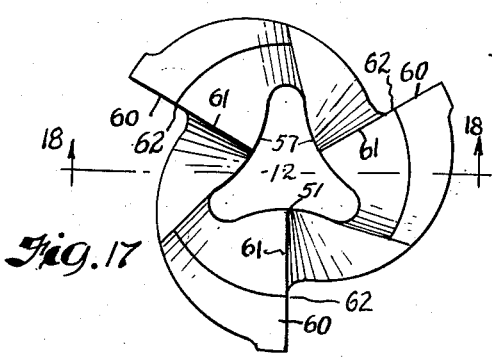
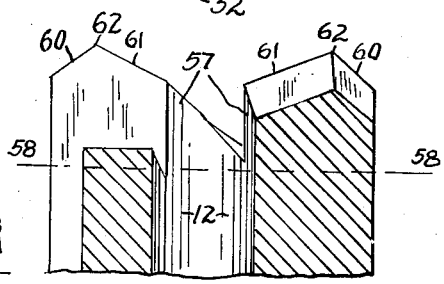
Fig. 17
Fig. 18
INVENTOR.
WILLIAM A. WAGNER
BY
Oberlin & Limbach
ATTORNEYS

United States Patent Office 2,847,885
Patented Aug. 19, 1958

2,847,885
DEEP HOLE DRILL

William A. Wagner, South Euclid, Ohio, assignor to The Cleveland Twist Drill Company, Cleveland, Ohio, a corporation of Ohio Application August 2, 1956, Serial No. 601,819

8 Claims. (Cl. 77—58)

This invention relates as indicated to deep hole drills and more specifically to such drills which cut away the work in an annular area, leaving a pillar which extends into the drill as the latter progresses into the work.

Drills of this character, when used on metal, as in drilling gun barrels, rely to a certain extent on the uncut pillar giving guidance to the tool so the hole will have a straight axis. Also a coolant or lubricant is forced through the drill to the bottom of the hole to lubricate and cool the cutting operation and flush the chips out of the hole.

It is a principal object of my invention to provide a drill having a relatively large axially extending passageway therethrough through which a sufficient amount of fluid may be forced during the drilling operation.

It is a more specific object of this invention to provide such a drill having its cutting end so formed that the fluid forced down said passageway will flow radially across said cutting end in substantially all directions.

It is a further object of my invention to provide a deep hole drill having cutting edges which remove the work in an annular area and subject the tool to balanced forces so that there is no tendency for the tool to be forced laterally in any direction with respect to its longitudinal axis.

It is still a further and important object of my invention to provide such a drill in which the cutting end thereof receives radial support in all directions from the uncut pillar.

Other objects and advantages of the present invention will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In the annexed drawings:

Figs. 5 through 17 are end views of other alternative forms of my invention; and Fig. 18 is a cross-sectional view of the drill of Fig. 17 taken in the plane and in the direction indicated by the line and the arrows at 18—18.

Broadly stated my invention consists of a drill comprising a generally cylindrical body provided with a cutting end and a passageway extending into said body from said cutting end, the wall of said passageway, in at least three circumferentially spaced axially extending areas lying closer to the longitudinal axis of the drill than the wall portions of said passageway between said areas, said areas being equidistant from the axis of the drill whereby upon rotation of the drill about its axis, said areas generate a cylinder coaxial with the drill, said areas so arranged that straight lines lying in a plane normal to the axis of the drill and sequentially joining the midpoint of said areas form a polygon which surrounds the axis of the drill, said cutting end effective to cut away the work only in the annular area between the periphery of the drill and said cylinder generated by said areas upon rotation of the drill about its axis, and chip carrying grooves in the periphery of said body extending axially thereof.

Figure 2:
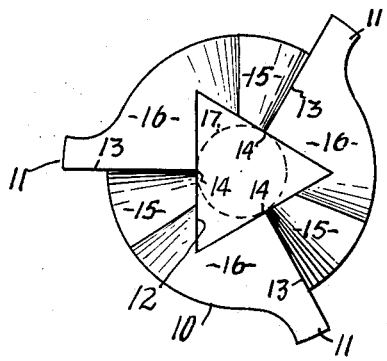
Fig. 2 is an end view of the drill of Fig. 1.
Figure 1:
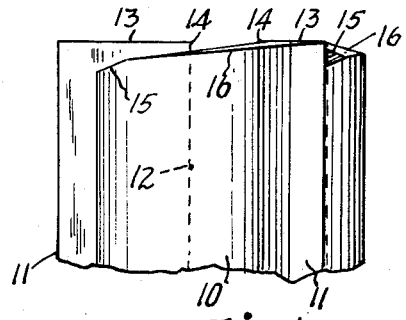
Fig. 1 is a plan view of one form of the drill of my invention.

With reference now to Figs. 1 and 2, which illustrate one embodiment of my invention, it will be noted that the body of the drill is generally an elongated cylinder on the surface of which are formed alternate flute and land areas 10 and 11 respectively. A passageway 12 extends axially of the body of the tool throughout its length. The passageway 12 has a cross-section, normal to the axis of the tool, in the shape of an equilateral triangle whose center lies on the axis of the tool.

On the tip of the tool are three cutting edges 13 each formed in part by the end of the leading edge of a land 11 and extend radially inwardly from the periphery of the tool across its end face to points which are midpoints 14 of the sides of the passageway 12. The tool as illustrated in Fig. 2 is a right-hand tool. Therefore, the areas 15 in advance of the cutting edges 13, are axially cut away to provide cutting edge clearance. The clearance areas 15 also provide radial passageways across the end of the tool through which fluid from the passageway 12 may flow radially outwardly to the periphery of the tool carrying therewith to the flute areas, the chips as cut away by the cutting edges.

When the drill is used, it is mounted in drilling machines, either of the horizontal or vertical type. Either the tool or the work may be rotated.

The inner ends 14 of the cutting edges 13 are all equidistant from the axis of rotation of the tool. The cutting edges 13, therefore, cut away the work in an annular area leaving an uncut pillar indicated by the dotted circle 17 in Fig. 2. The pillar 17 contacts the walls of the passageway 12 along three straight lines, parallel to the axis of the tool, which are the lines of tangency between the cylindrical pillar 17 and the walls of the passageway 12. In a plane normal to the axis of the tool, lines joining the points of contact between the walls of the passageway 12 and the pillar 17 form an equilateral triangle concentric with the axis of rotation of the tool so that the components of the supporting force at the contact points combine to support the tool against forces applied by the work to the tool in any radial direction.

Apparatus of any conventional type is employed to force a fluid from the shank of the tool through the portions of the passageway 12 which are not occupied by the pillar 17. This fluid flows across the areas 15 and 16 of the tip of the tool flushing away cuttings and cooling the tool and the work. After the fluid has crossed the tip of the drill it flows axially out of the drilled hole through the flutes 10. It should be noted that the fluid flows across the tip of the drill in substantially all radial directions since there are areas of clearance between the drill tip and the work at all points on the drill tip except at the cutting edges, and since these areas of clearance are all in direct communication with fluid carrying portions of the passageway 12.

Figure 4:
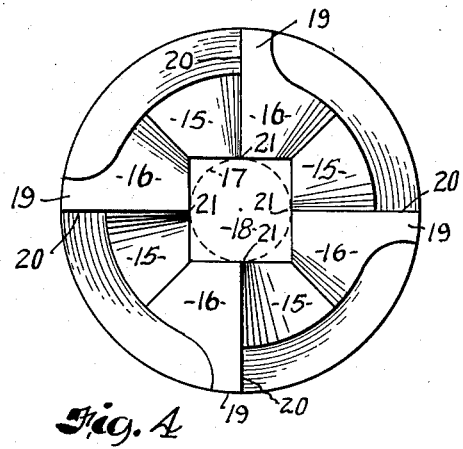
Fig. 4 is an end view of the drill of Fig. 3.
Figure 3:
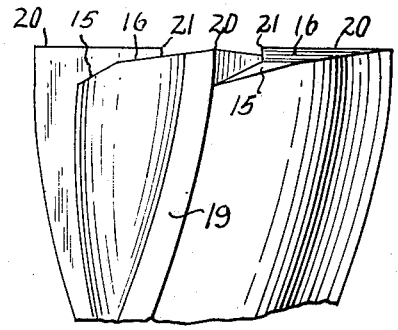
Fig. 3 is a plan view of an alternative form of my invention.

The drill illustrated in Figs. 3 and 4 is similar to the drill of Figs. 1 and 2 differing only in that the axial passageway 18 therethrough has a square cross-sectional area; the lands 19 on the tool are helical, and there are four cutting edges 20 extending radially from the periphery of the lands to the midpoints of the sides of the square opening. Some of the parts of the tool of Figs. 3 and 4 which are similar to parts of the tool in Figs. 1 and 2 are similarly numbered.

Figure 5:
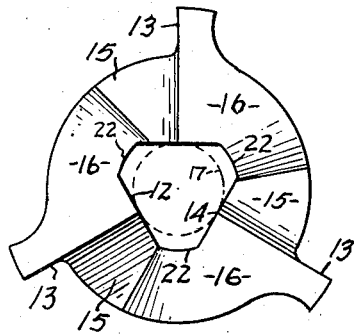

The drill illustrated in Fig. 5 is similar to that of Figs. 1 and 2 except that the corners of passageway 12 are rounded in the areas 22. Because the passageway 12 in this construction is not as close to the periphery of the tool as it is in the construction shown in Figs. 1 and 2, the construction shown in Fig. 5 is stronger, but part of the fluid carrying capacity of the passageway 12 has been sacrificed.

Figure 6:
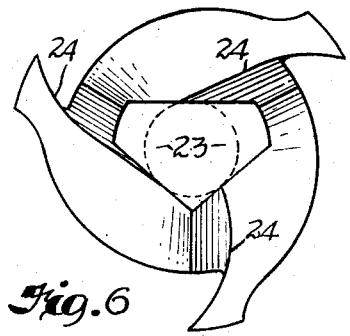

The construction illustrated in Fig. 6 is similar to that of Figs. 1 and 2 differing in that the triangular prismatic passageway 23 is isosceles instead of equilateral, and the cutting edges 24 are curved instead of straight.

Figure 7:
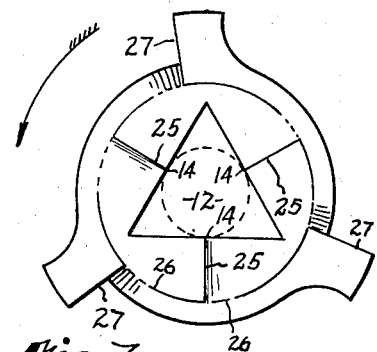

The modification illustrated in Fig. 7 is similar to that of Figs. 1 and 2 except that in this modification there are two radially juxtaposed and circumferentially spaced sets of cutting edges in the annular area between the periphery of the tool and the central opening. One set of cutting edges 25 extends radially from the central opening to an imaginary circle 26 which is concentric with the axis of the tool. The second set of cutting edges 27 extends from such circle 26 to the periphery of the tool. This expedient of providing two sets of cutting edges respectively at different radial distances from the axis of the tool distributes the torque to which the tool is subjected during use, more evenly over the solid cross-section of the tool.

Figure 8:
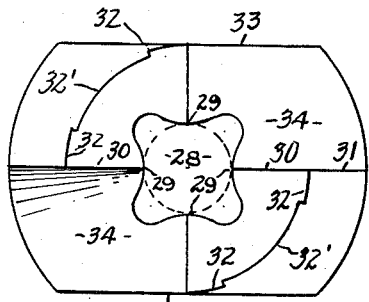

In the drill illustrated in Fig. 8 the walls of the passageway 28 which embrace the pillar in the four areas 29 are convex toward the axis of the tool. The walls of the passageway 28 intermediate of the areas 29 are relieved outwardly to increase the capacity of the passageway to convey fluid to the drill tip. All of the areas 29 are equidistant from the axis of the tool. Extending radially from two of the areas 29 are two cutting edges 30 which extend, on the same diameter, for equal distances radially outwardly from the center opening. Two additional cutting edges 31 extend radially from the outer ends of the cutting edges 30 to the periphery of the tool. The cutting edges 30 are axially displaced, toward the tip of the tool, from the cutting edges 31 so that the former enter the work to a greater extent than the cutting edges 31. The portions of the tool tip which follow and support the cutting edges 30 and 31 are separated by the areas 32 and 32′. The areas 32 lie on a cylinder the center of which is on the axis of the tool and the radius of which equals the radius of the outer end of the cutting edge 30. The areas 32′ lie radially inwardly from the areas 32. Two chordal sections 33 of the tool are removed to provide flutes through which cuttings and cooling fluid escape from the hole. It should be noted that the areas 34 in front of the cutting edges are relieved to provide clearance for the cutting edges. The fluid from the center opening sweeps across these relieved areas carrying the chips into the flutes and eventually out of the hole.

This form of the drill of my invention receives radial support in all directions by some component of force from the uncut pillar at the points 29, and also receives radial support from the work where the areas 32 contact the wall of the hole formed by the cutting edges 30.

Figure 9:
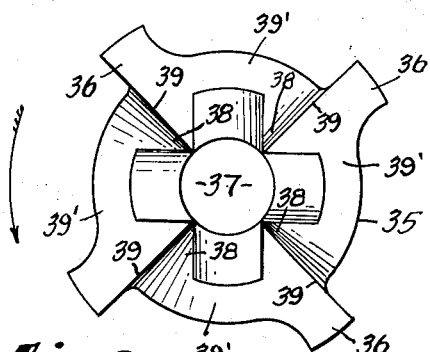

The form of the drill of my invention illustrated in Fig. 9 comprises a body 35 having four straight lands 36 thereon and containing a passageway 37 coaxial therewith. The passageway 37 is formed by the intersection of two slots whose center lines intersect at the axis of the tool. These slots may be planar or helical in form as they extend into the body of the tool. From each of the ends 38 of the four corners of intersection of said slots at the tip of the tool, a cutting edge 39 extends radially to the periphery of the tool. This form of my invention also leaves an uncut pillar which supports the end of the tool radially by bearing against corners of intersection of said slots. Cooling fluid forced through the passageway 37 from the shank of the tool flows toward the end of the tool through the radially outer portions of said slots. When the fluid issues from the passageway 37 at the end of the tool, it sweeps across the clearance areas 39′ carrying the chips into the flutes and out of the hole.

It should be noted that the tool illustrated in Fig. 9 has radially extending cutting edges. However, when the intersecting slots are helical so that the corners at their intersection, which are actually internal threads, are helical, and the tool is sharpened after being worn during use, the cutting edges will need to be curved at least at their inner portions so as to extend along the leading edges of the lands. Thus the use of helical lands having the same pitch as the internal threads in the center opening, in this form of tool is preferred in order to simplify the aforesaid correction if any is needed.

Figure 10:
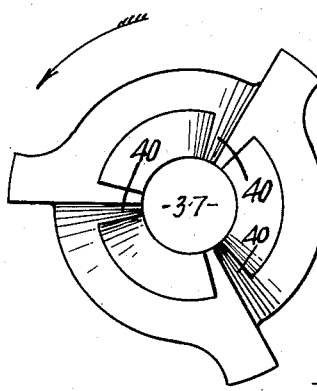

The construction illustrated in Fig. 10 is similar to that illustrated in Fig. 9 except that the tool of Fig. 10 has only three flutes and cutting edges and three helical raised portions 40 or internal threads extending into the passageway 37 and embracing the pillar. In this form of my invention the raised portions 40 have curved surfaces thereon which embrace the pillar.

Figure 11:
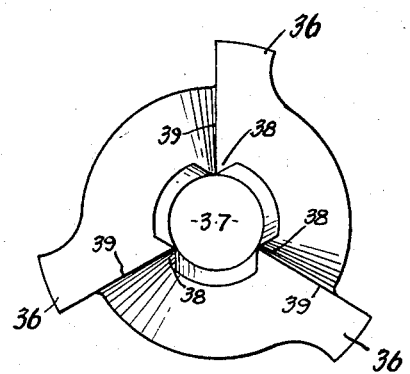

The construction illustrated in Fig. 11 is similar to that of Fig. 9 except that the tool of Fig. 11 has only three flutes, three cutting edges, and three threads in the passageway 37. It should be noted that the spaces between the threads need not be as deep as they are in the construction of Fig. 9 in order to provide an adequate fluid conveying passageway since they are of greater circumferential extent.

Figure 12:
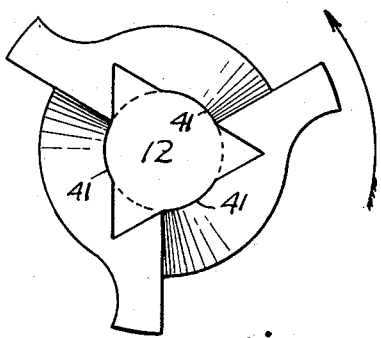

The drill illustrated in Fig. 12 is identical to the drill of Figs. 1 and 2 except that the walls of the passageway 12 have been rounded so that the pillar contacts the walls of the central opening over three extended areas 41.

The drills illustrated in Figs. 13 and 14 are similar to the drill of Figs. 1 and 2 differing from the latter in the cross-sectional shape of the passageways 42 and 43. The passageway 43 in Fig. 14 is formed by drilling three cylindrical holes 44 lengthwise of the tool. The holes are all the same diameter; their axes are parallel to the equidistant from the axis of the tool, and are equally spaced around the axis of the tool. The radii of the holes 44 are large enough so that each of the holes intersects the other two in an axially extending line 45. Cutting edges 46 extend from the periphery of the tool to the points where the lines 45 intersect the tip of the tool. When the tool is in use, the cutting edges 46 form an annular hole leaving a pillar centrally of the hole which radially supports the end of the tool by contacting all of the edges 45.

The tool in Fig. 13 is identical with the tool in Fig. 14 except that in the former a drill has been run into the passageway 42 coaxial therewith so that the lines of intersection of the holes 44 have been broadened to areas 47 which are segments of a cylinder coaxial with the tool.

The tool in Fig. 15 is identical to the tool in Fig. 5 except that in Fig. 15 the lands 48 and cutting edges 49 are curved in extending from the periphery of the tool along the leading edges of the lands and thence to the contact points 14, and the lands 48 are helical.

In the tool illustrated in Fig. 16 the passageway 50 extending axially through the tool is four sided. Each of the sides 51 is convex toward the axis of the tool, and all of the sides 51 are equidistant from the axis of the tool. The tool has two sets of lands 52 and 53. Extending from the periphery of the tool from the end of the forward edge of each of the lands 52 is a cutting edge 54 extending radially inwardly to the midpoint of the side 51 of the passageway 50 adjacent thereto. The cutting edges 54 form an annular hole leaving a central pillar which supports the end of the tool by contact with the axially extending areas at the middle of each of the sides 51. The end of the tool is also supported radially by contact between the wall of the drilled hole and the lands 52 and 53. The areas 55 of the drill tip in advance of the cutting edges 54 are cleared. The areas 56 behind each cutting edge slope rearwardly away from such cutting edges. The primary flutes of the drill terminate at the areas 55. The coolant forced down the passageway 50 sweeps across the areas 55 carrying the chips into the flutes and out of the hole.

Figs. 17 and 18 illustrate a form of the drill of my invention similar to the drill of Figs. 1 and 2. In Figs. 17 and 18, however, the sides 57 of the passageway 12 are convex toward the axis of the tool rather than flat, and the sides 57 as they enter the passageway 12 from the tool tip are slightly divergent from the axis of the tool. This divergence of the sides 57 extends axially of the tool to the line 58—58 in Fig. 18. From the line 58—58 throughout the remainder of the tool toward the shank, the walls 57 are parallel. The purpose of this divergence is to eliminate contact between the tool and the uncut pillar other than immediately adjacent the tool tip, which is the zone in which contact between the pillar and the walls of the central passageway has its greatest utility. When this expedient is employed the friction between the tool and the work is reduced to a minimum. This expedient of having the areas of the central opening wall which contact the uncut pillar diverge for at least a short distance away from the end of the tool may also be employed with the forms of the drill of my invention illustrated in Figs. 1 through 16.

The cutting end of the form of my invention illustrated in Figs. 17 and 18 is formed of six cutting edges, three cutting edges 60 and three cutting edges 61, arranged in pairs. In each pair the cutting edge 60 extends from the periphery of the tool forwardly and radially inwardly to a point 62 where it intersects the cutting edge 61; the cutting edge 61 extends from the point 62 rearwardly and radially inwardly to the point on the wall 57 of the passageway 12 which is closest to the axis of the tool. All three of the points 62 on this tool are equidistant from the tool's axis. This type of cutting edge has several advantages over the flat cutting edges illustrated above, and it should be understood that this and other types of inclined cutting edges may be employed in all of the forms of my invention. When this type of cutting edge is used, the points 62 score a circle on the work piece making it easier to start the hole at a desired point. Secondly, the chips cut by the cutting edges 60 and 61 are forced together as they are cut from the work so that they are broken into smaller pieces and are hence easier to flush out of the drilled hole through the flutes.

It will be observed that tools constructed according to this invention are supported at the cutting end by the uncut pillar by components of force extending in every radial direction. In order to be thus supported in all radial directions by the pillar, it is necessary that the end of the tool contact the pillar in at least three points which when joined by straight lines form a polygon surrounding the axis of the tool.

Ideally, the points of contact should be equally spaced around the axis of the tool. When so spaced, the contact points more or less equally carry any lateral force tending to cause the path of progress of the tool to deviate from a straight line.

As the number of contact points between the tool and the pillar is increased, the pillar's supporting effect on the tool is likewise increased. However, as the number of contact points is increased, the friction between the tool and the pillar increases, and the cross-sectional area of the passageway available for conveying fluid is reduced. It is, therefore, desirable to limit the number of areas of contact between the pillar and the tool to three or four, and the circumferential extent of each such contact area kept to a practical minimum.

Other modes of applying the principle of the invention may be employed, change being made as regards the details described, provided the features stated in any of the following claims or the equivalent of such be employed.

I therefore particularly point out and distinctly claim as my invention:

1. A deep hole drill comprising a generally cylindrical body formed with a plurality of exterior lands separated by a plurality of chip carrying grooves and extending from the cutting end of said body toward the shank end; said body being formed with a non-circular cross-section passageway that extends axially into said body from the cutting end, the wall of said passageway having at least three circumferentially spaced areas that are equidistant from and parallel to the longitudinal axis of the drill whereby, upon rotation of the drill about its axis and axial feeding thereof, such areas contact a cylinder of the work piece which is coaxial with the drill, such area contacts axially along such cylinder providing support against horizontal thrust forces in all directions and which cylinder serves together with the periphery of said lands to guide the drill so as to form a straight hole, the remainder of the wall of said passageway between such circumferentially spaced areas being spaced radially outward of such cylinder whereby to define with the latter a series of axially extending passages for flow of oil around and in contact with such cylinder to the cutting end of the drill as the drill is rotated and fed into a workpiece; such cutting end of said body being formed with circumferentially spaced cutting edges extending generally radially from such circumferentially spaced areas to the outer edges of said lands to generate such cylinder upon rotation of the drill, such cutting edges having clearances, the surfaces of which define radially extending passages intersecting such series of axially extending passages and said chip carrying grooves whereby flow of oil through such series of axially extending passages and through said radially extending passages carries the chips formed by said cutting edges out through said grooves, lubricates the guide cylinder left in the workpiece, and lubricates and cools the cutting edges.

2. A drill as defined in claim 1 characterized further in that said cutting edges extend continuously from the respective circumferentially spaced areas to the outer edges of said lands.

3. A drill as defined in claim 1 characterized further in that said cutting edges comprise first and second sets of cutting edges of which the first set extends generally radially outwardly from such circumferentially spaced areas to points lying on a circle of diameter less than that of said body and of which the second set is axially displaced with respect to said first set and extends generally radially outwardly from circumferentially spaced points lying on such aforementioned circle to the outer edges of said lands.

4. A drill as defined in claim 1 characterized further in that said circumferentially spaced areas are helical.

5. A drill as defined in claim 1 characterized further in that said non-circular cross-section passageway has flat wall portions, and in that said circumferentially spaced areas are lines of contact between said flat wall portions and said cylinder.

6. A drill as defined in claim 1 characterized further in that said circumferentially spaced areas are the lines of intersection of at least three equal cylinders whose axes are parallel to and equidistant from the axis of the drill.

7. A drill as defined in claim 1 characterized further in that the walls of said non-circular cross-section passageway are convex toward the axis of the drill and said circumferentially spaced areas are lines along said walls that are nearest to the axis of the drill.

8. A drill as defined in claim 1 characterized further in that said cutting edges have points between their radial extremities lying on a circle that is coaxial with the drill.

References Cited in the file of this patent
UNITED STATES PATENTS

| | | |
|---|---|---|
| 537,044 | Krauss | Apr. 9, 1895 |
| 1,829,659 | Kefflo | Oct. 27, 1931 |
| 2,294,969 | Enbvall et al. | Sept. 8, 1942 |
| 2,418,021 | Fleischer | Mar. 25, 1947 |